D. HEER.
DRIVING-PULLEY.
No. 174,238.  Patented Feb. 29, 1876.
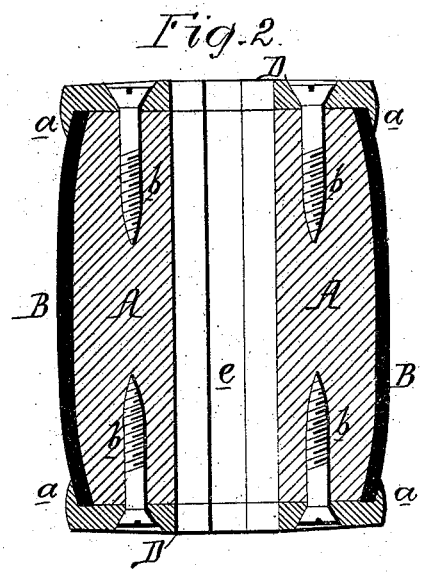
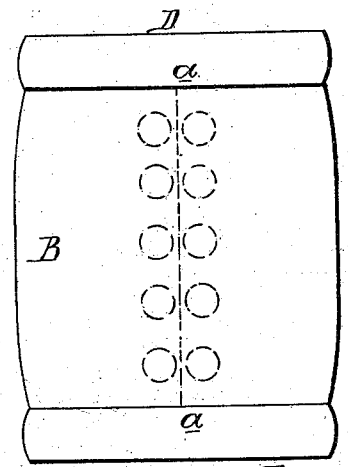
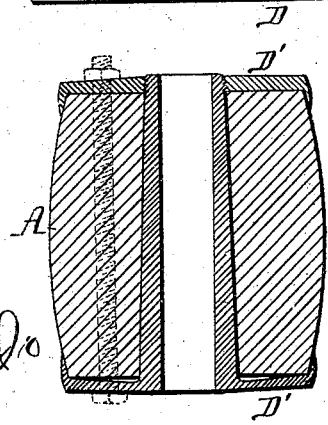
Witnesses
Harry Howson Jr
Harry Smith
David Heer
by his Attorneys
Howson and Son

UNITED STATES PATENT OFFICE.

DAVID HEER, OF PHILADELPHIA, PENNSYLVANIA.

IMPROVEMENT IN DRIVING-PULLEYS.

Specification forming part of Letters Patent No. 174,238, dated February 29, 1876; application filed February 14, 1876.

*To all whom it may concern:*

Be it known that I, DAVID HEER, of Philadelphia, Pennsylvania, have invented an Improved Driving-Pulley, of which the following is a specification:

The object of my invention is to make a light driving-pulley, on which a belt will be more effectually retained, and will be less liable to slip than an ordinary pulley; and this object I attain in the manner which I will now proceed to describe, reference being had to the accompanying drawing, in which—

Figure 1 is an exterior view of my improved pulley; Fig. 2, a sectional view; and Fig. 3, a view representing a modification of my invention.

In Figs. 1 and 2, A represents a block of wood turned nearly to the size of the required pulley, and larger in diameter at the middle than at the opposite end. To this turned block is fitted a short tube, B, of rubber, the said tube being of such a diameter that considerable force will be required to fit it over the said block, and so that it will tightly embrace the same. The ends of the tubes are confined to the block by the flanges *a* of the end plates D, which are secured to the ends of the block by ordinary wood-screws *b*. A hole of the proper diameter for receiving the shaft is bored in the block, and its plates and a slot, *e*, formed for the reception of a key, which secures the pulley to the shaft. The rubber tube has such an adhesive affinity for the wood that it cannot turn thereon under the action of the belt.

In the modification, Fig. 3, the block A is made wholly of rubber, and one of the end plates D′ has a hub extending entirely through the block, and has a threaded outer end adapted to internal threads in the other plate D′, so that by screwing the latter tight the rubber block will be effectually confined between the two plates. In this case the hub may be furnished with ribs adapted to recesses in the block to prevent the latter from turning on the said hub.

Bolts passing through the plates and through the block, as shown by dotted lines in Fig. 3, may be used for securing the plates, and either of the modes of fastening shown on this figure may be employed in connection with the wooden block.

The rubber covering may in some cases be composed of a strip wrapped round the block and secured to the same by nails or screws, as shown by dotted lines in Fig. 1; but, although I have found this plan to answer in practice, I prefer to force a tube of rubber onto the block in the manner described.

My improved pulley is especially well adapted to the spindles of circular saws and lathes, to the shafts of planing-machine cutters, and to other shafts which have to revolve at a high rate of speed, as the pulley is light, and its surface of rubber effectually prevents the belt from slipping or from leaving the pulley.

I claim as my invention—

A driving-pulley consisting of a block, A, composed of or coated with rubber, and confined between end plates D D′, having flanges overlapping the said rubber, as set forth.

In testimony whereof I have signed my name to this specification in the presence of two subscribing witnesses.

DAVID HEER.

Witnesses:
HARRY HOWSON, Jr.,
HARRY SMITH.